United States Patent [19]

Tahara

[11] Patent Number: 5,097,732
[45] Date of Patent: Mar. 24, 1992

[54] NUMERICALLY CONTROLLED DEVICE SUCH AS NUMERICALLY CONTROLLED SLITTER DEVICE

[75] Inventor: Yoshinori Tahara, Numazu, Japan
[73] Assignee: Meisan Co., Ltd., Fuji, Japan
[21] Appl. No.: 642,639
[22] Filed: Jan. 17, 1991
[30] Foreign Application Priority Data Jul. 16, 1990 [JP] Japan .................. 2-187489

[51] Int. Cl.⁵ .................. B26D 1/24; B26D 7/26
[52] U.S. Cl. .................. 83/76.001; 83/425.004; 83/499; 83/508.003
[58] Field of Search .................. 83/498, 499, 500, 502, 83/504, 508.3, 425.4, 76.1

[56] References Cited

U.S. PATENT DOCUMENTS

| | | | |
|---|---|---|---|
| 3,470,776 | 10/1969 | Brichard et al. | 83/700 X |
| 4,283,981 | 8/1981 | Trautmann | 83/499 X |
| 4,607,552 | 8/1986 | Siler | 83/499 X |
| 4,989,486 | 2/1991 | Miller et al. | 83/504 X |

Primary Examiner—Hien H. Phan
Assistant Examiner—Raymond D. Woods
Attorney, Agent, or Firm—Fleit, Jacobson, Cohn, Price, Holman & Stern

[57] ABSTRACT

A numerically controlled device such as a numerically controlled slitter device has a plurality of units. Intervals between the units are numerically controlled to desired values by moving the units. The numerically controlled device comprises an endless belt and a stationary belt provided through the respective units, driving means for driving the endless belt under a numeral control to move the respective units and a clutch provided at the respective units. The clutch includes a forward path clamper for selectively clamping the forward path of the endless belt, a backward path clamper for selectively clamping the backward path of the endless belt and a stationary belt clamper for selectively clamping the stationary belt to positively hold the respective unit.

2 Claims, 3 Drawing Sheets

NUMERICALLY CONTROLLED DEVICE SUCH AS NUMERICALLY CONTROLLED SLITTER DEVICE

BACKGROUND OF THE INVENTION

1. Field of the Invention

This invention relates to a numerically controlled device (NC device) such as a numerically controlled slitter device (NC slitter) for automatically cutting a sheet material such as paper or the like in a desired slitter width.

2. Description of the Prior Art

An NC slitter of this type has a plurality of slitting knife units, in which intervals between the slitting knife units are numerically controlled to desired values by moving the respective slitting knife units. As an example of a conventional NC slitter, there is an NC slitter in which slitting knife units are moved by driving motors provided at the respective slitting knife units. As another example, there is an NC slitter in which a screw provided through a plurality of slitting knife units is driven by one driving motor to move the respective slitting knife units.

Among the conventional examples described above, the NC slitter in which the driving motors are provided at the respective slitting knife units is convenient in that the slitting knife units can be moved simultaneously in both rightward and leftward directions by driving the respective driving motors in desired rotating directions, but its structure in which one driving motor is provided at each of the slitting knife units is complicated and high in cost, and its wirings and controls are also complicated.

The other NC slitter in which the screw and the one driving motor are employed is simple in structure as compared with the above-described former example, but the slitting knife units cannot be simultaneously moved in rightward and leftward directions. In other words, the slitting knife units can be simulataneously moved rightward or leftward, but if one slitting knife unit is desired to be moved in the rightward and the other slitting knife unit is desired to be moved in the leftward direction, both the slitting knife units cannot be simultaneously moved in the desired directions. For example, the slitting knife unit to be desired to be moved in the rightward direction must be first moved, and then the slitting knife unit to be desired to be moved in the opposite leftward direction must be moved. Thus, the more the number of the slitting knife units is increased, the longer it takes to complete the movements of the respective slitting knife units to the respective desired positions.

An object of the present invention is to provide an NC device which can eliminate the problems of the above-described conventional prior art and can simultaneously move a plurality of slitting knife units in both rightward and leftward directions and which has a simple structure.

SUMMARY OF THE INVENTION

As shown in FIG. 5 of the accompanying drawings, the fundamental principle of the present invention is that a plurality of units can be simultaneously moved in both rightward and leftward directions by selectively grasping a belt at a desired side thereof, due to the fact that the moving directions of upper and lower sides of an endless belt (including an endless chain or wire, etc.) extended between two pulleys are in reverse directions.

According to this invention, there is provided a numerically controlled device having a plurality of units in which intervals between the units are numerically controlled to desired values by moving the units, said device comprising an endless belt provided through the respective units, driving means for driving the endless belt under a numerical control to move the respective units, and clutch means provided at the respective units, the clutch means having a forward path clamper for selectively clamping the forward path of the endless belt and a backward path clamper for selectively clamping the backward path of the endless belt.

With an arrangement described above of the present invention, the unit desired to be moved in a rightward direction is secured to the forward path of an endless belt through a forward path clamper of clutch means, the other unit desired to be moved in a leftward direction is secured to the backward path of the endless belt through a backward path clamper of the clutch means, the unit secured to the forward path can be moved rightward and the unit secured to the backward path can be simultaneously moved leftward by driving means for rotatably driving the endless belt clockwise means.

This invention will now be described in further detail with regard to preferred embodiments as illustrated in the accompanying drawings.

DESCRIPTION OF THE PREFERRED EMBODIMENTS

Figure 1:
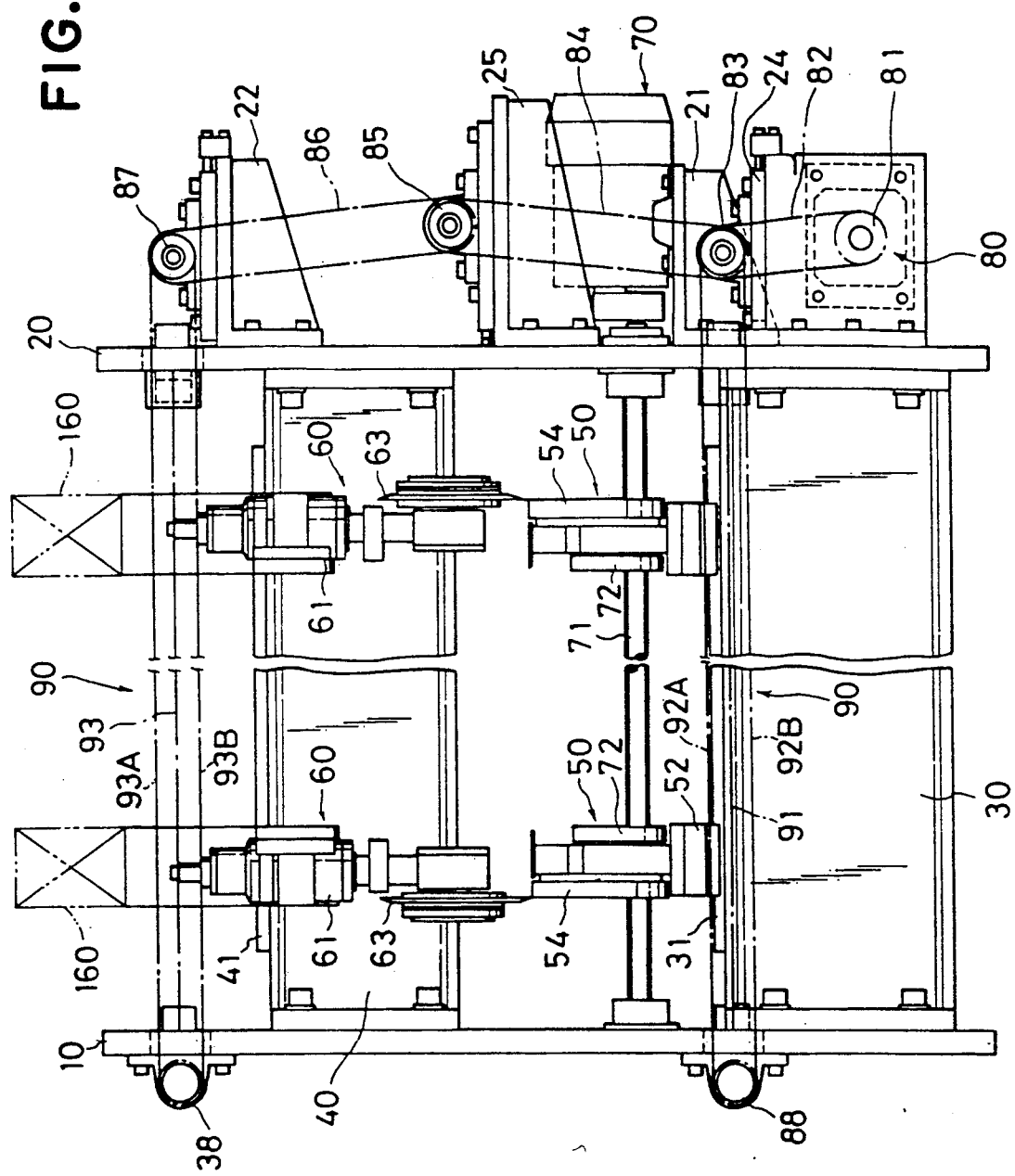
FIG. 1 is a schematic front view showing an NC slitter as an embodiment of the present invention.
Figure 2:
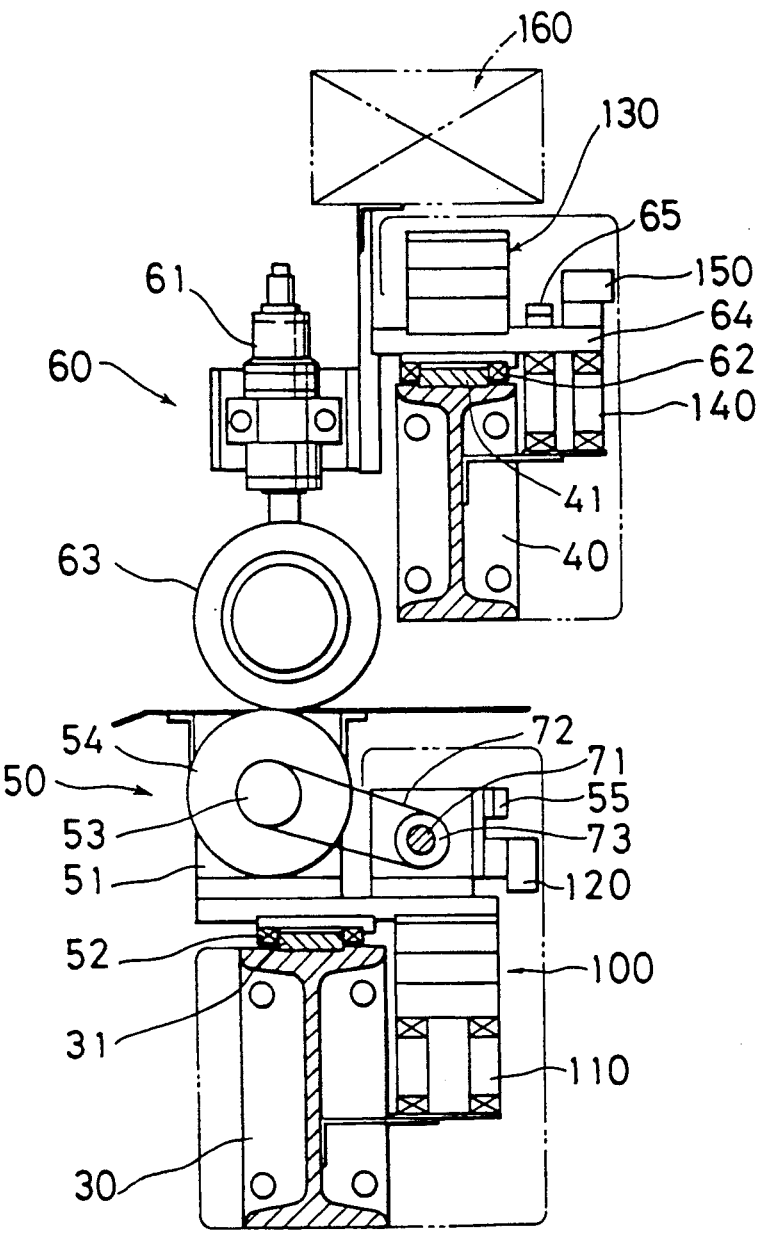
FIG. 2 is a schematic side view of the NC slitter of FIG. 1.
Figure 5:
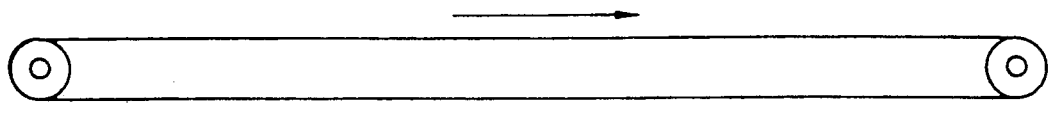
FIG. 5 is a schematic view for explaining a principle of the present invention.

As shown in FIGS. 1 and 2, an NC slitter of this embodiment comprises left and right stationary frames 10 and 20, and a lower knife slide beam 30 and an upper knife slide beam 40 provided between the stationary frames 10 and 20. The lower knife slide beam 30 has, as better shown in the side view of FIG. 2, a slide rail 31 on its upper surface, and the upper knife slide beam 40 also has a slide rail 41 on its upper surface. This NC slitter has a plurality of slitting knife units, and only two of them are shown in FIG. 1. Each sitting knife unit has a lower knife unit 50 and an upper knife unit 60. The lower knife holder 51 of the lower knife unit 50 is so attached to the lower knife slide beam 30 as to be able to slide along the slide rail 31 through a linear bearing 52. The upper knife holder 61, of the upper knife unit 60 is so attached to the upper knife slide beam 40 as to be able to slide along the slide rail 41 through a linear bearing 62.

A lower knife 54 is rotatably provided at the lower knife holder 51, and an upper knife 63 is rotatably provided at the upper knife holder 61. As better shown in FIG. 1, a lower knife rotatably driving motor 70 is provided at a mounting frame 21 provided in the right side stationary frame 20. The lower knife rotatably driving motor 70 can rotatably drive a ball spline 71 provided to rotate between the left and right stationary frames 10 and 20. As better shown in FIG. 2, the lower knife 54 of the lower knife unit 50 is rotated by a belt 72 engaged between a pulley 73 rotating upon rotation of the ball spline 71 and a pulley 53 attached to the rotational shaft of the lower knife 54. The upper knife 63 is rotated to be driven in pressure contact with the lower knife.

A pulley 88 is provided under the left side stationary frame 10, a pulley 83 is provided at a mounting frame 24 provided in the right side stationary frame 20, and an endless steel belt 90 is provided between these pulleys 83 and 88. The endless steel belt 90 is provided to move the lower knife units 50 in a desired direction to be described in detail later, and their forward path 92A and backward path 92B are extended through the respective lower knife units 50. A stationary steel belt 91 is so extended between the left side stationary frame 10 and the right side stationary frame 20 as to extend between the forward path 92A and the backward path 92B of the above-described endless steel belt 90. Similarly, a pulley 38 is provided above the left side stationary frame 10, a pulley 87 is provided at the mounting frame 22 provided in the right side stationary frame 20, and the endless steel belt 90 is engaged between these pulleys 38 and 87. The endless steel belt 90 is provided to move the respective upper knife units 60 in a desired direction to be described in more detail later, and the forward and backward paths 93A and 93B are extended through the respective upper knife units 60. A stationary steel belt 93 is so extended between the left side stationary frame 10 and the right side stationary frame 20 as to extend between the forward path 93A and the backward path 93B of the above-described endless steel belt 90.

A driving motor 80 for driving the endless steel belt 90 is mounted in the vicinity of the lower portion of the right side stationary frame 20. The driving motor 80 rotatably drives the pulley 83 through the pulley 81 and the belt 82. An intermediate pulley 85 is provided at the mounting frame 25 provided in the right side stationary frame 20, the belt 84 is engaged between the intermediate pulley 85 and the pulley 83, and a belt 86 is also engaged between the intermediate pulley 85 and the pulley 87. Accordingly, when the driving motor 80 is energized, the respective endless steel belts 90 are rotatably driven in the same direction through the pulley 81, the belt 82, the pulley 83, the belt 84, the pulley 85, the belt 86 and the pulley 87.

On the other hand, as better shown in FIG. 2, clutch units 100 are respectively provided relatively to the lower endless steel belts 90 at the lower knife units 50 of the respective slitting knife units, and clutch units 130 are respectively provided relatively to the upper endless steel belts 90 at the upper knife units 60. The clutch units 100 and the clutch units 130 have the same structure, and accordingly only the clutch unit 100 will be described in detail.

Figure 3:
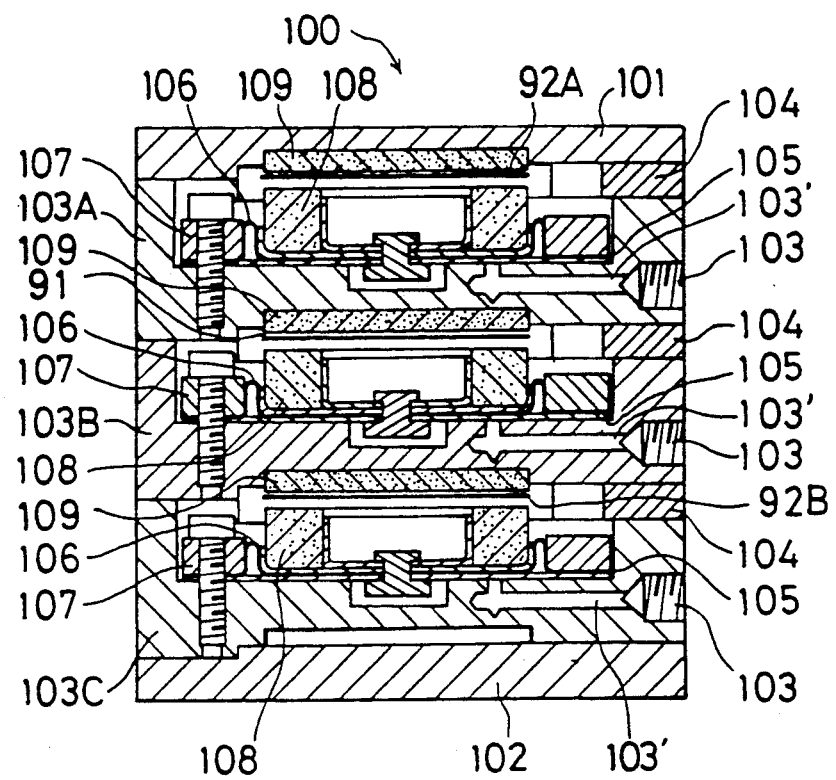
FIG. 3 is a sectional view showing a clutch unit used for the NC slitter of FIG. 1 in detail.
Figure 4:
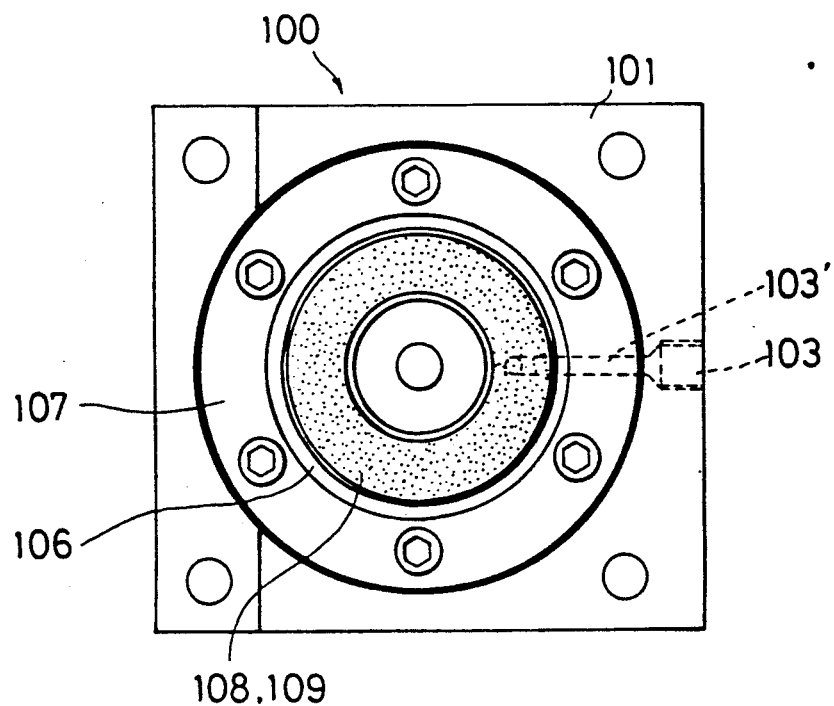
FIG. 4 is a plan view of the clutch unit of FIG. 3.

FIG. 3 is a sectional view of the clutch unit 100 in detail, and FIG. 4 is a plan view of FIG. 3. As better shown in FIG. 3, the clutch unit 100 fixedly interposes three holders 103A, 103B and 103C through spacers 104 between an upper plate 101 and a lower plate 102. A plate spring 105 and a diaphragm piston 106 are attached with a diaphragm securing ring 107 to each of the holders 103A, 103B and 103C. A movable friction pad 108 is attached to each plate spring 105 and each diaphragm piston 106. Stationary friction pads 109 are attached at positions opposite to the corresponding movable friction pads 108 on the lower surfaces of the upper plate 101, the holder 103A and 103B. A compressed air inlet 103 and a compressed air passage 103' opened at the lower surface of the diaphragm piston 106 to extend from the compressed air inlet 103 are formed at each of the holders 103A, 103B and 103C.

When the clutch unit 100 as described above is assembled, the forward path 92A of the endless steel belt 90 extended between the pulley 88 and the pulley 83 is interposed between the movable friction pad 108 of the holder 103A and the stationary friction pad 109 opposed to the movable friction pad 108, the backward path 92B is interposed between the movable friction pad 108 of the holder 103C and the stationary friction pad 109 opposed to the movable friction pad 108, and the stationary steel belt 91 extended between the stationary frame 10 and the stationary frame 20 and between the forward path 92A and the backward path 92B is interposed between the movable friction pad 108 of the holder 103B and the stationary friction pad 109 opposed to the movable friction pad 108.

The operation of the clutch unit 100 as described above will be described. When compressed air is not applied from a suitable compressed air source (not shown) through the corresponding compressed air inlet 103 and compressed air passage 103' to the diaphragm piston 106, the movable friction pad 108 is disposed at a position separated from the opposed stationary friction pad 109 by means of the elastic deviation force of the plate spring 105. Accordingly, the steel belt is not clamped therebetween in this state, and the steel belt can freely moved therebetween. On the other hand, when the compressed air is applied from the compressed air source through the corresponding compressed air inlet 103 and compressed air passage 103' to the diaphragm piston 106, the movable friction pad 108 is moved to a position in contact with the stationary friction pad 109 opposed thereto against the elastic deviation force of the plate spring 105. Accordingly, the steel belt therebetween is strongly interposed to be held between the movable friction pad 108 and the stationary friction pad 109 to be clamped in this state.

As better shown in FIG. 2, the clutch unit 100 is mounted fixedly on the lower surface of the lower knife holder 51 of each lower knife unit 50. Further, a collision preventing limit switch 55 and a compressed air switching solenoid valve 120 are provided at the lower knife holder 51. The compressed air conduits and wirings are supplied through cable bearer 110. The clutch unit 130 is so mounted fixedly on a member 64 mounted on the upper side beam 40 as to slide the upper edge holder 61 of each upper knife unit 60 along the slide rail 40 through the linear bearing 62. Further, a collision preventing limit switch 65 and a compressed air switching solenoid valve 150 are provided at the member 64. A manual operation box 160 is also provided at the top of the member 64. These conduits and wirings are supplied through the cable bearer 140.

The operation of the entire NC slitter of the arrangement as described above will be eventually described.

In the case of altering the slitted width of a sheet material such as paper or the like, the slitting knife units 50 and 60 shown in the right side in FIG. 1 are moved to the right side at a desired distance, the slitting knife units 50 and 60 shown in the left side in FIG. 1 are moved to the left side at a desired distance, and the other slitting knife units (not shown) at their positions. First, the compressed air is applied through the compressed air inlet 103 and compressed air passage 103' of the holder 103A of the clutch unit 100 of the lower knife unit 50 by switching the compressed air switching solenoid valve 120 of the right side slitting knife unit to a suitable position to press the movable friction pad 108 to stationary friction pad 109, thereby clamping the forward path 92A of the lower endless steel belt 90. Similarly, the compressed air is applied through the compressed air inlet 103 and compressed air passage 103, of the holder 103A of the clutch unit 130 of the upper knife unit 60 by switching the compressed air switching solenoid valve 150 of the right side slitting knife unit to a suitable position to press the movable friction pad 108 to its stationary friction pad 109, thereby clamping the forward path 93A of the upper endless steel belt 90. The compressed air is also applied through the compressed air inlet 103 and compressed air passage 103' of the holder 103C of the clutch unit 100 of the lower edge unit 50 by switching the compressed air switching solenoid valve 120 of the left side slitting knife unit to a suitable position to press the movable friction pad 108 to its stationary friction pad 109, thereby clamping the backward path 92B of the lower endless steel belt 90. Similarly, the compressed air is applied through the compressed air inlet 103 and compressed air passage 103' of the holder 103C of the clutch unit 130 of the upper knife unit 60 by switching the compressed air switching solenoid valve 150 of the left side slitting knife unit to a suitable position to press the movable friction pad 108 to its stationary friction pad 109, thereby clamping the backward path 93B of the upper endless steel belt 90. Further, with respect to the other slitting knife units, the compressed air is applied through the compressed air inlet 103 and compressed air passage 103' of the holder 103B of the clutch unit 100 of the lower knife unit 50 and the clutch unit 130 of the upper knife unit 60 by switching the compressed air switching solenoid valves 120 and 150 to suitable positions to press the movable friction pad 108 to the stationary friction pad 109, thereby clamping the stationary steel belts 91 and 93. The compressed air is not applied to the compressed air inlet 103 of the holder except those as described above of the clutch units 100 and 130, and the corresponding steel belts are not clamped.

After the clampers are clamped in the state as described above, the driving motor 80 is energized to simultaneously rotate the lower endless steel belt 90 and the upper endless steel belt 90 clockwise. Then, since the lower knife unit 50 and the upper knife unit 60 of the right side slitting knife unit are clamped fixedly at the forward paths 92A and 93A of the respective endless steel belts 90 through the clutch units 100 and 130, they are slid rightwardly along the lower knife slide beam 30 and the upper knife slide beam 40 as they move rightward with the forward paths 92A and 93A. Simultaneously, since the lower knife unit 50 and the upper knife unit 60 of the left side slitting knife unit are clamped fixedly at the backward paths 92B and 93B of the respective endless steel belts 90 through the clutch units 100 and 130, they are slid leftwardly along the lower knife slide beam 30 and the upper knife slide beam 40 as they move leftwardly with the backward paths 92B and 93B. At this time, since the lower knife units and the upper knife units 60 of the other slitting knife units (not shown) are clamped fixedly at the respective stationary steel belts 91 and 93 through the clutch units 100 and 103, they are left steadily at their positions irrespective of the rotations of the lower and upper endless steel belts 90.

As described above, after the right side and left side slitting knife units are completely moved simultaneously at a desired distance in desired directions, the stationary steel belts 91 and 93 are clamped at the clutch units 100 and 130 by suitably switching the compressed air switching solenoid valves 120 and 150 to suitable positions, and the endless steel belts 90 are all unclamped. Thus, the altering operation of the slit width is completed, and the slitting operation of the sheet material can be started by rotating in contact the lower knife 54 and the upper knife 63.

The measurement of the moving distance of the above-described slitting knife unit may be conducted in an open loop by using a pulse motor (stepper motor) as the driving motor for driving the pulleys of the endless steel belt or may be conducted by counting the number of pulses generated by a pulse generator separately driven by the rotation of the driving motor, or may be conducted by a closed loop system for counting a moving distance by providing a linear scale on the slide beam, or by other suitable methods. An instruction control of the driving motor and the compressed air switching solenoid may be rapidly performed by a computer, automatically for all the altering movement of the desired slit width, merely by inputting necessary data to the computer.

The adjustments of contact pressure of the lower knife 54 with the upper knife 63 may be performed by moving only the upper knife to obtain a predetermined contact pressure after the lower knife unit 50 and the upper knife unit 60 are completely moved simultaneously to a predetermined position.

In the embodiments described above, the present invention is applied to the NC slitter. However, the present invention is not limited to the particular embodiments, but may also be applied to other similar NC machines within the spirits and scope of the present invention.

According to the present invention, as apparent from the foregoing description of the arrangements and operation of the embodiments as described above, the desired units may be moved simultaneously at desired distances in both rightward and leftward directions merely by rotatably driving the endless belts (endless chains, or wires) by one driving motor. Accordingly, the NC device such as the NC slitter may be inexpensively provided very simply, and the interval between the units can be very rapidly altered. That is, according to the arrangement of the NC device of the present invention, in the case of altering the slitted width or the like, the respective units can be sequentially completely moved from those having shorter moving distance irrespective of the rightward and leftward moving directions from the present positions, and the altering operation can be very rapidly completed.

What is claimed is:

1. A numerically controlled device having a plurality of units in which intervals between said units are numerically controlled to desired values by moving said units, said device comprising an endless belt provided through each of said units and having a forward path and a backward path, a stationary belt provided between said forward path and said backward path of said endless belt and extending parallel to said forward path and said backward path, driving means for driving said endless belt under a numerical control to move each of said units, and clutch means provided on each of said units, said clutch means having a forward path clamper for selectively clamping a respective unit to said forward path of said endless belt, a backward path clamper for selectively clamping the respective unit to said backward path of said endless belt and a stationary belt clamper for selectively clamping the respective unit to said stationary belt.

2. A numerically controlled device as claimed in claim 1, wherein said units include a plurality of cooperating pairs of upper and lower slitting knife units, the stationary and endless belts being provided through the upper unit of each pair; and said device includes a second endless belt and a second stationary belt extending parallel between forward and backward paths of the second endless belt, said second belts being provided through the lower unit of each pair.

* * * * *